United States Patent
Buerkle et al.

(10) Patent No.: US 12,116,013 B2
(45) Date of Patent: Oct. 15, 2024

(54) DISTRIBUTED IN-VEHICLE REALTIME SENSOR DATA PROCESSING AS A SERVICE

(71) Applicant: Intel Corporation, Santa Clara, CA (US)

(72) Inventors: Cornelius Buerkle, Karlsruhe (DE); Kay-Ulrich Scholl, Malsch (DE); Fabian Oboril, Karlsruhe (DE); Frederik Pasch, Karlsruhe (DE)

(73) Assignee: Intel Corporation, Santa Clara, CA (US)

(*) Notice: Subject to any disclaimer, the term of this patent is extended or adjusted under 35 U.S.C. 154(b) by 785 days.

(21) Appl. No.: 17/131,175

(22) Filed: Dec. 22, 2020

(65) Prior Publication Data
US 2021/0107530 A1    Apr. 15, 2021

(51) Int. Cl.
*B60W 60/00*    (2020.01)
*B60W 50/14*    (2020.01)
(Continued)

(52) U.S. Cl.
CPC ...... *B60W 60/00253* (2020.02); *B60W 50/14* (2013.01); *G06F 21/6245* (2013.01);
(Continued)

(58) Field of Classification Search
CPC ........... B60W 60/00253; B60W 50/14; B60W 2420/408; B60W 2050/146;
(Continued)

(56) References Cited

U.S. PATENT DOCUMENTS

| 7,457,693 | B2 * | 11/2008 | Olsen | B60R 25/102 |
| | | | | 701/29.3 |
| 7,571,036 | B2 * | 8/2009 | Olsen | B60R 25/102 |
| | | | | 701/29.3 |

(Continued)

FOREIGN PATENT DOCUMENTS

| EP | 3696767 | 8/2020 |
| WO | 2019053524 | 3/2019 |

OTHER PUBLICATIONS

Tim Tiedemann et al., An Automotive Distributed Mobile Sensor Data Collection with Machine Learning Based Data Fusion and Analysis on a Central Backend System, 2016 Science Direct, pp. 570-579.*

(Continued)

*Primary Examiner* — Manglesh M Patel
(74) *Attorney, Agent, or Firm* — Schwegman Lundberg & Woessner, P.A.

(57) ABSTRACT

A system for a distributed in-vehicle real-time sensor data processing can be adapted to receive a request for sensor data from vehicles. The system may be further adapted to generate an application for collection of the sensor data. The application may have sensor requirements for performing the collection of sensor data. The system may be further adapted to identify a set of vehicles for distribution of the application based on available sensors in each vehicle corresponding to the sensor requirements. The system may be further adapted to transmit the application to the set of vehicles and receive sensor data results from respective instances of the application executing on the set of vehicles. The system may be further adapted to transmit a command to remove the respective instances of the application from the set of vehicles.

21 Claims, 6 Drawing Sheets

(51) Int. Cl.
*G06F 21/62* (2013.01)
*G08G 1/123* (2006.01)

(52) U.S. Cl.
CPC ......... *G06F 21/6272* (2013.01); *G08G 1/123* (2013.01); *B60W 2050/146* (2013.01); *B60W 2420/403* (2013.01); *B60W 2420/408* (2024.01); *B60W 2420/54* (2013.01)

(58) Field of Classification Search
CPC ....... B60W 2420/403; B60W 2420/54; B60W 2420/00; G06F 21/6245; G06F 21/6272; G08G 1/123
USPC .............. 701/23, 29.8, 30.3–30.9, 31.1, 29.3
See application file for complete search history.

(56) References Cited

U.S. PATENT DOCUMENTS

| | | | | |
|---|---|---|---|---|
| 8,274,377 | B2* | 9/2012 | Smith | H04L 67/125 |
| | | | | 340/506 |
| 8,417,490 | B1* | 4/2013 | Preston | G06F 30/15 |
| | | | | 703/22 |
| 9,026,304 | B2* | 5/2015 | Olsen, III | G07C 5/008 |
| | | | | 701/29.5 |
| 9,311,676 | B2* | 4/2016 | Helitzer | G16Z 99/00 |
| 9,741,183 | B2* | 8/2017 | Matos | H04W 48/20 |
| 9,830,823 | B1* | 11/2017 | Chainer | G08G 1/164 |
| 10,048,700 | B1 | 8/2018 | Curlander et al. | |
| 10,115,164 | B1* | 10/2018 | Binion | B60W 50/14 |
| 10,216,485 | B2* | 2/2019 | Misra | H04L 41/5096 |
| 10,810,806 | B2* | 10/2020 | Petousis | H04W 4/44 |
| 11,587,367 | B2* | 2/2023 | Petousis | G07C 5/008 |
| 11,651,632 | B2* | 5/2023 | Pirwani | G06Q 10/08 |
| | | | | 701/29.3 |
| 11,976,940 | B2* | 5/2024 | Hashimoto | G01C 21/3885 |
| 2004/0107042 | A1* | 6/2004 | Seick | G08G 1/0104 |
| | | | | 701/423 |
| 2005/0203683 | A1* | 9/2005 | Olsen | G08G 1/042 |
| | | | | 701/29.3 |
| 2006/0136105 | A1* | 6/2006 | Larson | G06Q 10/06 |
| | | | | 701/29.5 |
| 2006/0143599 | A1* | 6/2006 | Yeh | G06F 8/656 |
| | | | | 717/168 |
| 2009/0072997 | A1* | 3/2009 | Shrum, Jr. | G08G 1/127 |
| | | | | 340/905 |
| 2009/0289812 | A1* | 11/2009 | Kim | G08G 1/096758 |
| | | | | 340/905 |
| 2010/0063651 | A1* | 3/2010 | Anderson | G05D 1/0088 |
| | | | | 701/1 |
| 2010/0131942 | A1* | 5/2010 | Nannenga | G06F 8/61 |
| | | | | 717/176 |
| 2010/0231370 | A1* | 9/2010 | Lefaure | B60C 23/0416 |
| | | | | 340/438 |
| 2011/0260884 | A1* | 10/2011 | Yi | G07C 5/008 |
| | | | | 340/870.02 |
| 2014/0303882 | A1* | 10/2014 | Jang | G08G 1/09675 |
| | | | | 701/119 |
| 2016/0117868 | A1* | 4/2016 | Mitchell | H04L 63/0428 |
| | | | | 701/32.3 |
| 2016/0280224 | A1* | 9/2016 | Tatourian | B60W 40/076 |
| 2017/0080319 | A1* | 3/2017 | Bastawros | G01S 19/19 |
| 2017/0245419 | A1* | 8/2017 | Barbosa | B64C 39/024 |
| 2017/0278323 | A1* | 9/2017 | Gupta | H04L 63/1408 |
| 2018/0018834 | A1* | 1/2018 | Walker | G08G 1/20 |
| 2018/0061151 | A1* | 3/2018 | Chainer | H04W 4/40 |
| 2018/0074202 | A1* | 3/2018 | Liang | G05D 1/0257 |
| 2018/0090009 | A1* | 3/2018 | Roessler | G08G 1/096708 |
| 2018/0211115 | A1* | 7/2018 | Klein | G08B 29/188 |
| 2018/0293885 | A1* | 10/2018 | Lee | G08G 1/091 |
| 2019/0122453 | A1* | 4/2019 | Wright | H04M 1/6075 |
| 2019/0196806 | A1* | 6/2019 | Ewert | B60R 16/023 |
| 2019/0225233 | A1* | 7/2019 | Tod | G05D 1/0088 |
| 2019/0378363 | A1* | 12/2019 | Becker | G05D 1/0221 |
| 2020/0159247 | A1* | 5/2020 | Cohen | G06V 20/41 |
| 2020/0180652 | A1* | 6/2020 | Yang | G06F 18/251 |
| 2020/0201315 | A1* | 6/2020 | Gogna | G05D 1/0088 |
| 2020/0219336 | A1* | 7/2020 | Huffman | G08G 1/0129 |
| 2020/0236521 | A1* | 7/2020 | Vassilovski | G08B 29/188 |
| 2020/0262438 | A1 | 8/2020 | Bai et al. | |
| 2020/0336541 | A1* | 10/2020 | Naderi Alizadeh | H04L 67/12 |
| 2020/0374053 | A1* | 11/2020 | Hwang | H04W 4/40 |
| 2021/0297827 | A1* | 9/2021 | Ucar | H04W 4/40 |
| 2023/0064267 | A1* | 3/2023 | Krutsch | G08G 1/096838 |
| 2023/0104010 | A1* | 4/2023 | Hashimoto | G06F 16/1805 |
| | | | | 707/736 |
| 2023/0109736 | A1* | 4/2023 | Hashimoto | G06F 16/2246 |
| | | | | 707/625 |
| 2023/0116471 | A1* | 4/2023 | Sanchez | B60W 40/09 |
| | | | | 705/7.33 |
| 2023/0169805 | A1* | 6/2023 | Ramnani | G07C 5/008 |
| | | | | 701/29.3 |
| 2023/0300196 | A1* | 9/2023 | Lei | H04L 67/12 |
| | | | | 709/223 |

OTHER PUBLICATIONS

John Mena et al., On the Use of In-Vehicle Sensors for Weather Data Collection and Mapping, 2019 IEEE, pp. 1-6 (pdf).*

Mark Stevens et al., A Flexible On-Board Unit ARchitecture for Sensor Data and Fleet Management Services, 2018, IEEE, pp. 1-8 (pdf).*

Nikolina Bodiroga et al., Evaluation of fleet management data collection backend using Cassandra database, 2021, IEEE, pp. 177-181.*

Zhuo Wang et al., Efficent Data Collection for Connected Vehicles With Embedded Feedback-Based Dynamic Feature Selection, Jan. 2024, IEEE, pp. 1-11.*

"European Application Serial No. 21198560.1, Extended European Search Report mailed Mar. 23, 2022", 8 pgs.

* cited by examiner

DISTRIBUTED IN-VEHICLE REALTIME SENSOR DATA PROCESSING AS A SERVICE

TECHNICAL FIELD

Embodiments described herein generally relate to automated vehicle sensing and, more specifically, to distributing secure collection applications to collect sensor data from vehicles.

BACKGROUND

Presently, many vehicles with advanced driver assistance systems (ADAS) or autonomous vehicles (AV) are being driven while using cameras, light detection and ranging (LiDAR) cameras, radars, and other sensors which gather data. The data collection may be amplified, with the introduction of Mobility-as-a-Service (MaaS), such as robotaxis, and amplified further as MaaS implementations and use proliferateData that may be collected by vehicles may be of interest for third party applications. Potential applications may include street maintenance, such as the detection of broken streetlamps, tree branches too close to streets, parking offender, critical traffic situations that may need immediate authority attention, wildfires, road damage, and suspicious activity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Data analytics are being used more and more to understand, control, and improve our world. An aspect of this process is the acquisition of data. In the context of roadways or cities, acquiring useful data may include the distribution and maintenance of expensive, in-place, sensors, or the employ of human surveyors. Thus, resource constrained entities, such as small cities may not be able to handle the large up-front or maintenance costs of in-place sensors—and even better funded cities may struggle with installation and maintenance costs—and must rely on smaller, and less effective, human observers.

Vehicles, such as automobiles, are incorporating sensors and artificial intelligence (AI) to assist the operators of the vehicles, such as with ADAS, or for the operation of completely autonomous vehicles. These vehicles include sensors such as cameras, microphones, gyroscopes, thermometers, global positioning system (GPS), and accelerometers. Each sensor may not be utilized at all times, providing opportunities for the sensor to collect data when not in use for the functioning of the vehicle. Additionally, sensor data collected from the functioning of the vehicle may be stored and analyzed as part of collection of data for a specific task. For example, the video recorded from a camera for assisted driving may be stored and later analyzed to identify potholes in the roadway.

The systems and techniques described herein include receiving data requests that may be collected from vehicles and identifying vehicles for the collection of data based on the sensors available in each vehicle, as well as factors based on the capability of collecting the requested data. For example, an automobile would not be tasked with collecting data from a railway. The systems and techniques may further include generating applications that securely collect the data such that the systems of the vehicle and the privacy of a vehicle operator or owner is not compromised.

Figure 1:
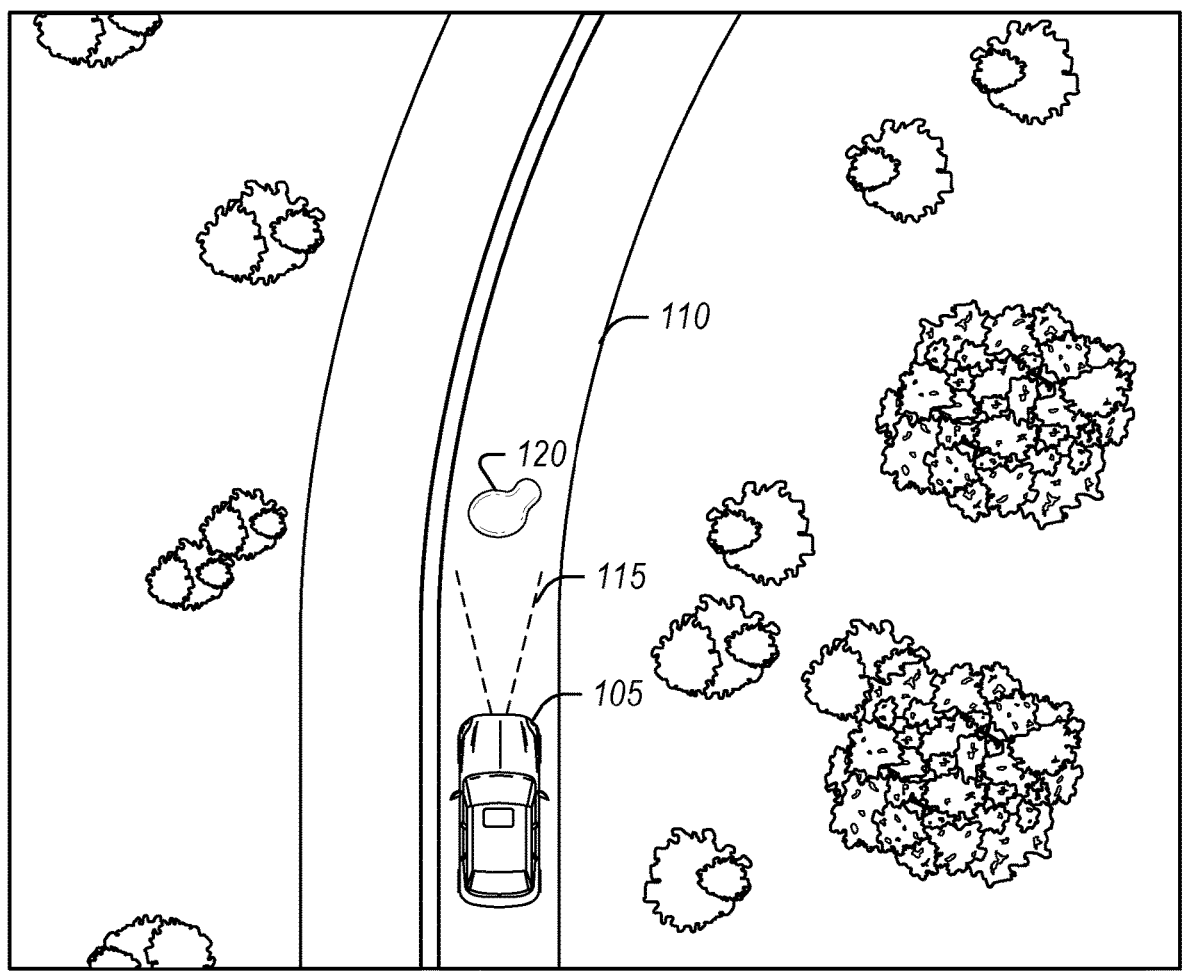
FIG. 1 illustrates a scenario for detection of roadway hazards, in accordance with some embodiments.

FIG. 1 illustrates a scenario 100 for detection of roadway hazards, in accordance with some embodiments. In the scenario 100, a vehicle 105 may be equipped with ADAS. The ADAS system may include a camera, which has a field of view 115. The vehicle 105 may include a temporary application tasked with identifying roadways hazards. As the vehicle 105 travels along the roadway 110, the field of view 115 of the camera may capture a pothole 120 or other roadway hazards. This data captured by the camera of the vehicle 105 may then be reported by the application to a requesting party. For example, a municipality may have requested identifying roadway hazards.

A customer or third party client may provide a request for data. The request may include instructions for what should be detected or monitored. For example, a request may be for the detection of potholes in the roadway. The request may include a location or area from which the data should be gathered. For example, if detecting potholes, then the location may be within the boundaries of a city, as the city is not responsible for potholes outside of the city. The request may include a time for data collection and a duration for data collection. For example, if detecting broken streetlights, then the data collection may be performed at night. The duration may indicate how long the data collection should be performed, such as for two weeks.

A front-end service provider may generate or develop a data collection application. This may include developing a data processing chain and performing tests with offline available data, such as stored recorded datasets. The service provider may define how the application fits into existing priority definitions of all existing applications, which may include vehicle operational applications, applications installed by the vehicle owner, and additional data collection applications.

Different types of vehicles may provide different interfaces to sensors, although the type of data (e.g. camera streams, lidar data, radar data) may be comparable or may be easily transformed into unified forms. Similarly, environment model descriptions may be utilized, such as the Association for Standards of Automation and Measuring (ASAM) OpenDRIVE and OpenSCENARIO.

For different vehicle platforms, there may be different device drivers to access the device and sensor interfaces of the vehicle 105 and transform the data into common formats. The data processing may be adapted such that the available hardware is optimally used so that toolkits such as OneAPI and OpenVINO may be used. The final results, which may have very low bandwidth for detected objects and sums of events may be sent to the cloud. For the communication, platform specific interfaces may be required that enable the usage of existing communication components or services.

The application generation may include a model-based approach where the vehicle platform specific parts, devices, and sensors are defined separately from the application specific parts. A database may store the available data and distribution systems with information for which applications, based on the required data types, may be deployed to which of the available vehicles types or fleets.

The generation of the application may define the required data streams and data processing. Then code generation and system integration may automatically select and integrate with the required interfaces and algorithms which are available as libraries for the vehicles.

The distributed application may include interfaces to sensors and environment models, based on existing ADAS and AV functions, as input for additional data processing approaches. The distribution may be for fleet owners, such as rental car agencies and taxi services, which may employ a large number of vehicles for the data collection. While the descriptions contained herein may focus on automobiles, such as automobiles with ADAS, the same techniques may be applied for any type of vehicle with sensors, such as trains, planes, boats, bicycles, electric scooters, and drones. The descriptions may focus on the sensor being a camera as most AVs and vehicles with ADAS require a camera for operation, similarly the techniques may apply to any type of sensor. For example, a microphone may be used to detect gun shots.

Figure 2:
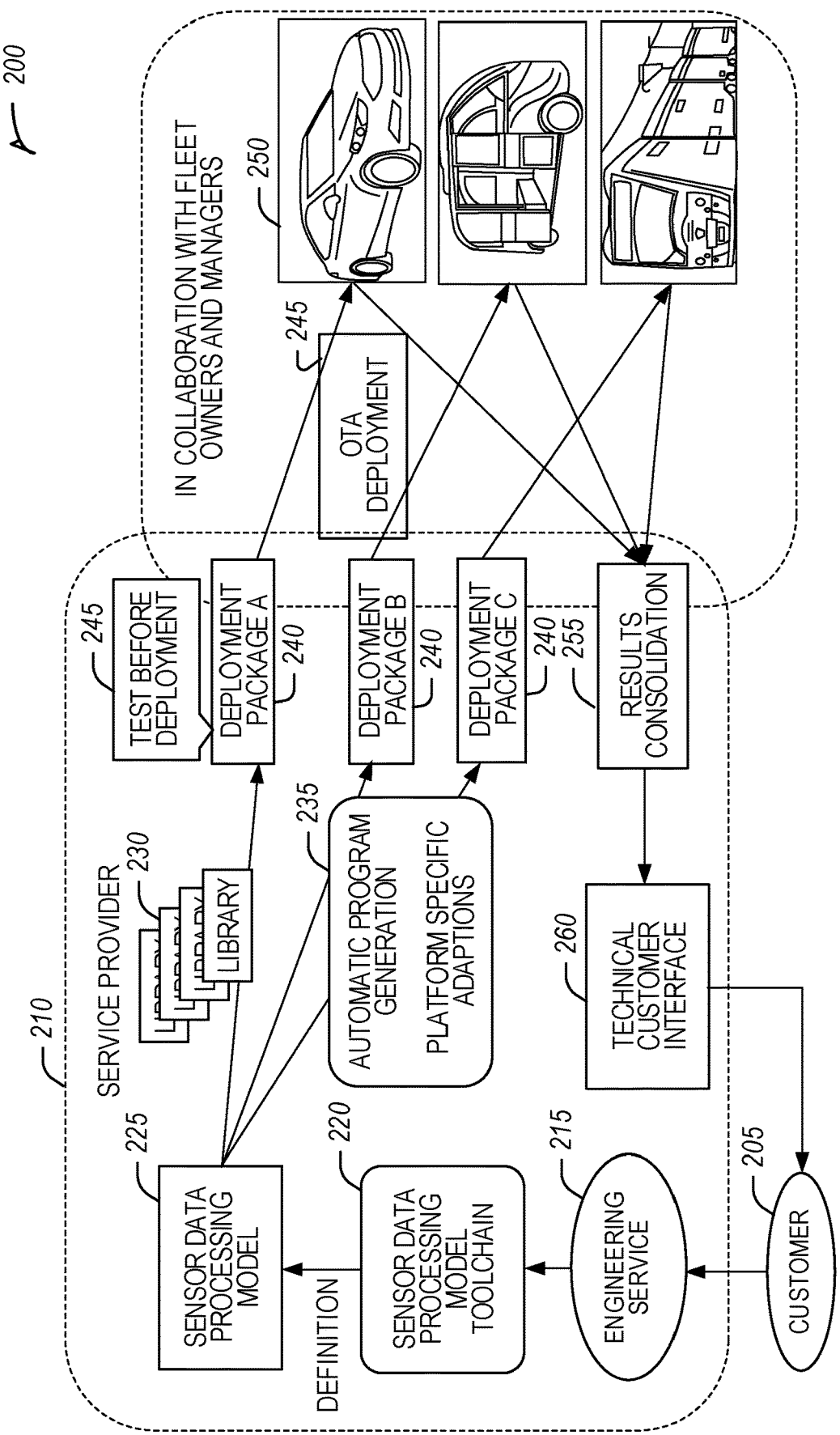
FIG. 2 illustrates the generation and deployment process for distributed in-vehicle sensor data processing, in accordance with some embodiments.

FIG. 2 illustrates the generation and deployment process 200 for distributed in-vehicle sensor data processing, in accordance with some embodiments. A customer 205 or third party may provide a request for data to be collected from the sensors of vehicles. The requests may have many purposes. For example, the request may be of a public good nature, such as detecting roadway hazards, or for marketing and commercial purposes, such as detecting how many people wear a brand of shoe.

The request from the customer 205 may be received by an engineering service 215 at a service provider 210. The engineering service 215 may make use of a sensor data processing model toolchain 220 to define the sensors and the type of data to be collected by vehicle, which then creates the sensor data processing model 225. The sensor data processing model 225 may model instances where multiple applications are installed on one vehicle or system. This may include modelling instances when the multiple applications are to be activated at the same time. These instances may result in resource conflicts that might prevent execution of all of the applications. The modelling approach of the applications may consider priority handling of multiple applications. For example, prioritization may be based on the importance of the application, such as wildfire detection may be more important than pothole detection. In another example, prioritization may be based on a business criteria, such as a first customer pays more to have their application prioritized over others.

Utilizing a set of libraries 230 for different types of vehicles and the different types of sensors, automatic program generation 235 generates deployment packages 240. The automatic program generation 235 may include platform specific adaptation, which are generated using the libraries 230. The deployment packages may be dependent on the type of vehicle and the type of sensors available in each vehicle. For example, while identified type of vehicle for collection may be an automobile, two different deployment packages may be generated based on the types of sensors that may be available in each vehicle of the deployment fleet.

The deployment packages 240 may be tested before deployment 245. The testing may be performed using virtual versions of vehicles or digital twins, to simulate the vehicles and use previously recorded sensor datasets. The testing may provide information related to the estimation of resource consumption. The resource consumption estimation may be used to determine which applications may be executed on the target platform in parallel. A decision table based on the resource consumption estimations may be generated and included in the installation package. The decision table may be used on the target platform, the vehicle, for when prioritization decisions are needed.

The owner of the vehicles 250, such as a fleet owner, may coordinate with the service provider 210 so that over the air (OTA) deployment 245 of the application may occur. The OTA deployment 245 may deliver the deployment package 240 to each vehicle 250. When received at each vehicle 250, the deployment package 240 may be installed. The installed applications may include detection algorithms that are activated based on localization and possibly direction of the vehicles 250, the region, scheduling, and prioritization. The number of installed and activated detection applications may depend on available storage in each vehicle, the required computing power, and priorities with other deployed detection applications, which may be defined by the service provider 210.

The applications may be engineered such that the processing of the requested detection is performed by the application, so that only results from the sensor data collection may be transmitted back to the service provider 210. This may prevent personal or private information that is unrelated to the sensor data collection from being transmitted to any unauthorized parties. The data may be transmitted periodically throughout the collection duration or as a complete package once the request duration is complete. The service provider 210 may then consolidate the results 255 and perform the necessary processing of the collected data into the requested results. The service provider 210 may provide a technical customer interface 260 for the customer 205 to access and view the results of the sensor data collection.

The deployed applications to the vehicles, or the target systems, should not negatively impact any functions or features of the vehicle, especially any safety or operational functions. Thus, interfaces may be required that provide for accessing the available sensor data, such as raw and pre-processed sensor data, as well as environment model data that may be utilized by ADAS and AV functions. Vehicle driving assistance system may include bus systems which provide for capturing the available data streams and protocols, or sensor data may be available from non-critical systems, such as In-Vehicle-Infotainment Systems.

The deployed applications may collect data from either existing sensors and systems that are non-critical to the driving tasks or may use system interfaces that may access the available data streams and wireless communication services. In some instances, a service execution box may be added to a vehicle to ensure the processing and performance of the deployed applications is separated from the vehicles functional systems. The service execution box may include accelerators that simplify the execution of the data processing algorithms for the deployed applications. Multiple applications may be executed on service execution box and may be separated by virtualization.

Figure 3:
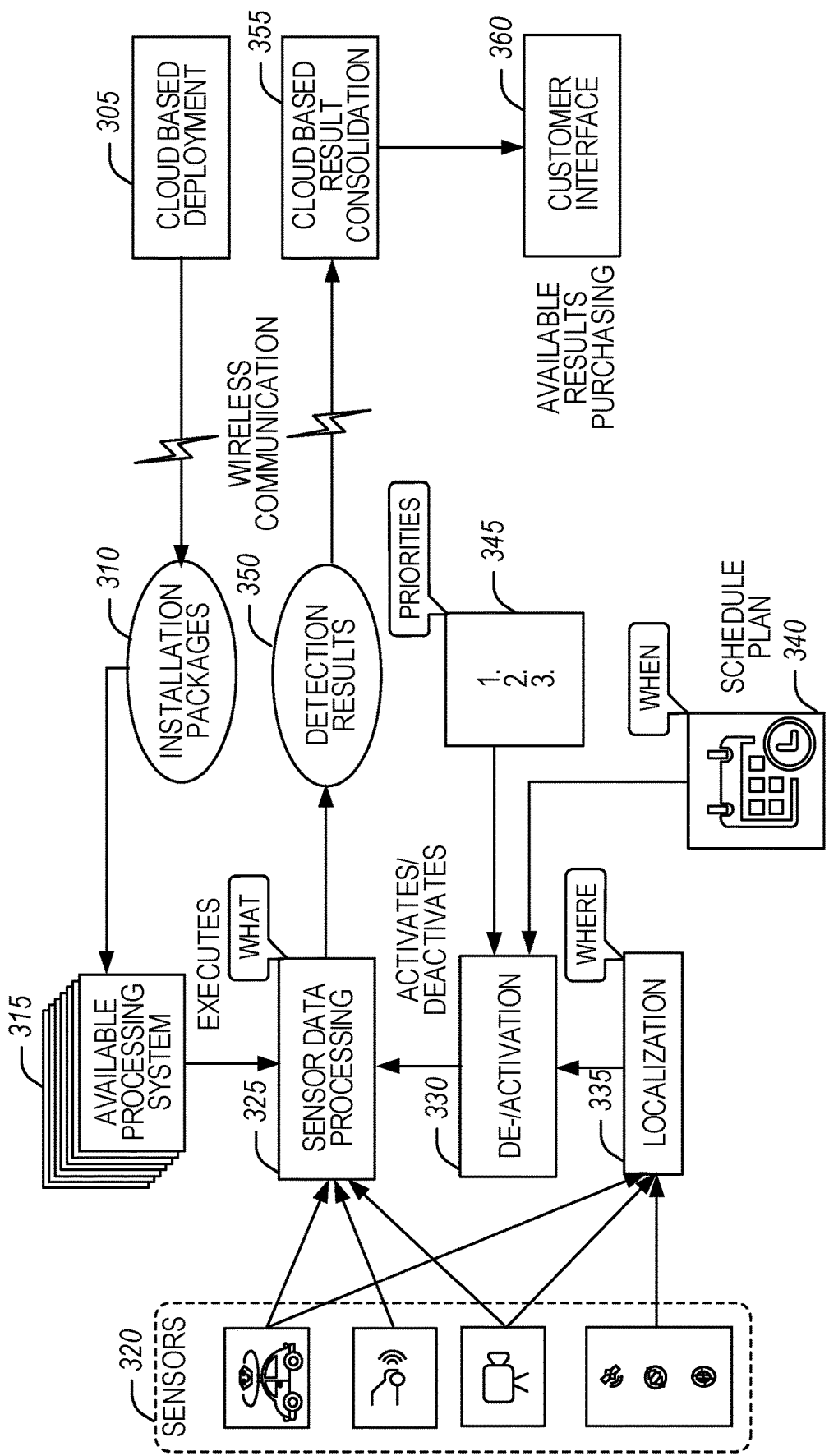
FIG. 3 illustrates the request definition usage of a deployed application, in accordance with some embodiments.

FIG. 3 illustrates the request definition usage of a deployed application, in accordance with some embodiments. Utilizing cloud based deployment 305, the deployed installation packages 310 may be wirelessly communicated, or OTA, to the vehicle. The available processing systems 315 of the vehicle may execute the applications provided in the installation packages 310.

The sensor data requests may include parameters, such as the location or times for collecting data. The deployed applications thus do not execute at all times, but instead are activated based on the parameters. The available processing systems 315 may be activated and deactivated 330 based on the request parameters. This may include a schedule plan 340 for the times at which the sensor data collection should occur. This may include prioritization 345 based on the other data collection applications and the functions of the vehicle systems. This may include localization 335 to determine the location of the vehicle. The localization 335 may utilize the sensors 320 of the vehicle to determine the location.

These parameters may activate 330 the sensor data processing 325. The sensor data processing 325 may receive sensor data from the sensors 320. The sensor data processing 325 may process the sensor data to extract the data requested. This may then produce the detection results 350. For example, if the requested task is the detection of pot holes, the complete video including sound with the tracked path of the vehicle is not needed. Instead, the sensor data processing 325 may use all of this data provided from the sensors 320 to identify and locate a pothole, but the detection results 350 may be limited to the location and a still picture of the pothole.

The detection results 350 may be wirelessly communicated to a cloud based result consolidation system 355. The cloud based result consolidation system 355 may consolidate the collected results and format the results into a customer accessible format. The customer accessible results may then be presented in a customer interface 360. In some instances, the general aspects of what the data represents may be provided and allow additional customers to purchase the full detailed data set results.

The collection of sensor data may include the collection of personal or private data. Thus, necessary steps may be taken to ensure the privacy of the data and the release of data that focuses on the requested task without exposing personal information, such as tracking an unknowing person. For a fleet owner, having third party detection software installed on the fleet of vehicle, it is important for the fleet owners to insure that the installed software is not violating privacy regulations. If one of the installed third party data collection applications does violate these regulations there might be negative consequences for the fleet owner.

The third party software or deployed application executed on a vehicle's autonomous system may describe the use case and information that is being detected. The output interface of the application may be designed to describe the use case as close as possible. For example, class information may be transferred as enumerated type variable instead of an integer or for floating point values a reasonable range may be defined.

Figure 4:
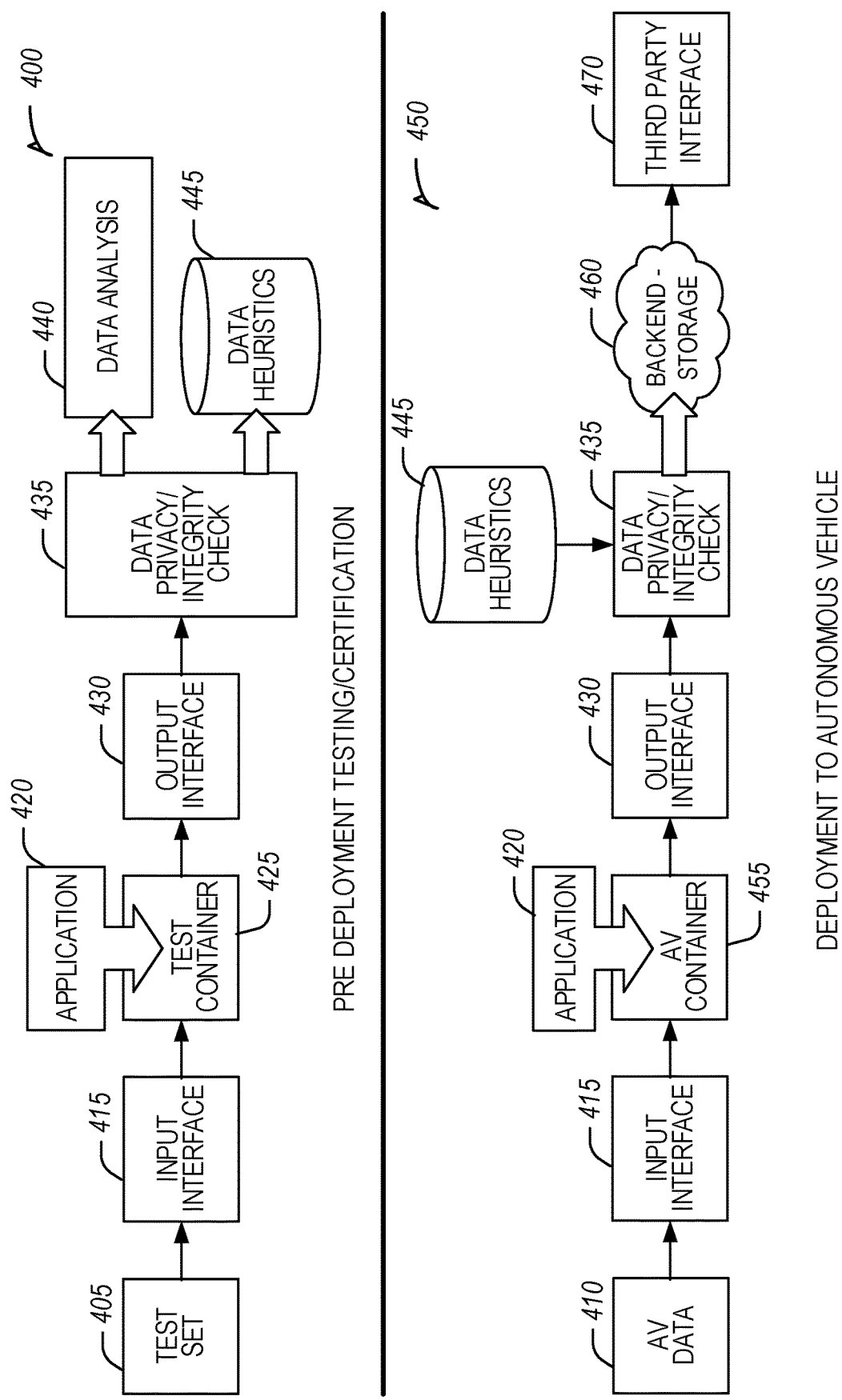
FIG. 4 illustrates the pre-deployment testing and deployment execution 450, in accordance with some embodiments.

FIG. 4 illustrates the pre-deployment testing 400 and deployment execution 450, in accordance with some embodiments. In the pre-deployment testing 400, a test set 405 of sensor data is provided to an input interface 415 that that provides the sensor data to the applications. The data collection application 420 may be embedded in a test container 425 that may be part of the application deployment to a fleet. The data collection application 420 may be executed with the test set 405. The test set 405 may include previous recordings of AV sensors.

The results of executing the data collection application 420 with the test set 405 are received at the output interface 430 and processed through a data privacy and integrity check 435 to ensure personal and private information is not exposed. A data analysis 440 of the output results is then performed to validate that the data collection application 420 is performing as described and requested. The data analysis 440 may be performed manually or test automation. Additionally, a data heuristic 445 of the output data is generated. The data heuristics 445 may identify data characteristics, such as ranges or values or distributions of values.

The deployment execution 450 illustrates the implementation of the data collection application 420 when deployed to a vehicle, such as an AV. The AV may generate a set of AV sensor data 410. The AV sensor data is received by the input interface 415 and provided to the data collection application 420. The data collection application 420 may execute within an AV container 455. The AV container 455 may be the same as the test container 425. The AV container 455 may limit access to the interfaces and resources of the AV. Using the AV container 455 may separate the data collection application 420 from the main AV software and applications to prevent malicious or faulty code from affecting the AV safety.

The output results of the execution of the data collection application may be received at the output interface 430, which is then validated through the data privacy and integrity check 435. The data privacy and integrity check 435 includes the data heuristics 445 generated from the testing for additional validation. If the data privacy and integrity check 435 is successful, the output results may be sent to the cloud for backend storage 460. A third party interface 470 may be provided for a client, customer, or third party vendor to access the results.

If anomalies are detected or the output results do not pass the data privacy and integrity check 435 using the data heuristics 445, then a warning may be generated and stored together with a recording of the input data and output results. This information may be used to analyze the input data and output results to determine errors such as a privacy violation or malfunctioning sensors.

Figure 5:
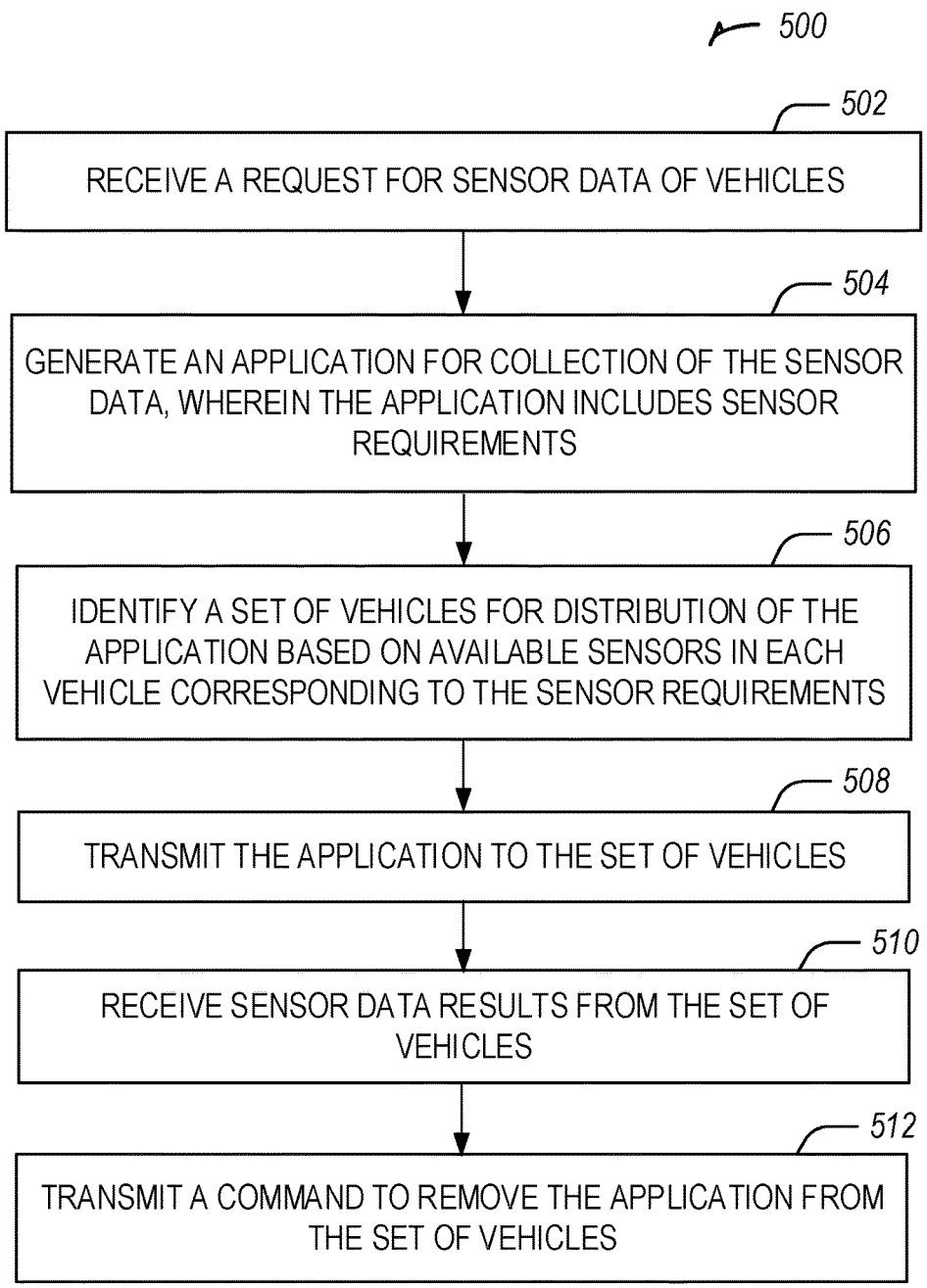
FIG. 5 illustrates a flowchart showing a technique for distributed in-vehicle sensor data processing, in accordance with some embodiments.

FIG. 5 illustrates a flowchart showing a technique 500 for distributed in-vehicle sensor data processing, in accordance with some embodiments. The technique 500 includes an operation 502 to receive a request for sensor data of vehicles. The vehicles may include AVs or vehicles with assisted driving systems. The vehicles may include automobiles, boats, planes, drones, and bicycles. The vehicles may be a part of a fleet, such as taxis, rental cars, busses, or transport trucks. The request may include a location and a time of day for collection of the sensor data. For example, the location may be within the city limits and the time of day may be between 9:00 AM and 12:00 PM. The request may include a duration for the collection of the sensor data, such as two weeks.

The technique 500 includes an operation 504 to generate an application for collection of the sensor data. Based on the request, an application may be generated to perform the request. The application may include sensor requirements. When the application is generated, the types of sensors needed to perform the data collection of the application may be identified. This may generate a set of sensor requirements so that vehicles with the adequate sensors can be identified. For example, a request for detecting the sound of gunshots would require a microphone sensor.

The technique 500 includes an operation 506 to identify a set of vehicles for distribution of the application based on available sensors in each vehicle corresponding to the sensor requirements. For example, if a camera sensor is required for the data collection, then a set of vehicles with cameras is identified. The identification of the set of vehicles may be based on a location of each vehicle corresponding to the location of the request. For example, a fleet owner may have vehicles that operate throughout a large metropolitan area. If the requested location is for a suburb of the metropolitan area, then vehicles located in or around that suburb may be identified as part of the set of vehicles.

The technique 500 includes an operation 508 to transmit the application to the set of vehicles. The transmission may be an OTA transmission that includes the application and other software containers for the application to interact with the systems of the vehicle. The technique 500 may include further operations to determine a schedule for execution of the application based on the time of day for collection of the sensor data from the request and transmit the schedule for execution of the application to the set of vehicles. For example, if the request is to capture sensor data at night, then a schedule may be to perform the sensor collection from 7:00 PM to 6:00 AM. The technique 500 may include further operations to determine a priority for the application and transmit the priority for the application to the set of vehicles, wherein the priority is defined based on present vehicle priorities. The priority may be determined and defined based on the operations of the vehicle and additional data collection applications presently executing on the vehicle. Priorities may be defined based on a customer paying for prioritization or based on the public good.

The technique 500 includes an operation 510 to receive sensor data results from the set of vehicles. The vehicles may transmit the collected sensor data at intervals or when the duration of the collection period is completed. The vehicles may transmit data collection results immediately for some types of data collection, such as those concerning public safety like the detection of gunshots. The technique 500 includes an operation 512 to transmit a command to remove the application from the set of vehicles.

The technique 500 may include further operations to validate that the sensor data results correspond to the request for sensor data. This may include validating that the results include the information requested, such as confirming the result data include the identification of potholes when the request was to identify potholes. The validation may include using data heuristics to validate the sensor data results, such as confirming the result values are within a proper range for the given request. For example, the identification of ten million potholes may be outside the reasonable range for identifying potholes over a week long period. The validation of the sensor data results may include verifying the sensor data results comply with a privacy policy. For example, a privacy policy may include not providing any images of people's faces in the results. In another example, the privacy policy may filter the amount of location data provided may lead to tracking of a vehicle operator.

Figure 6:
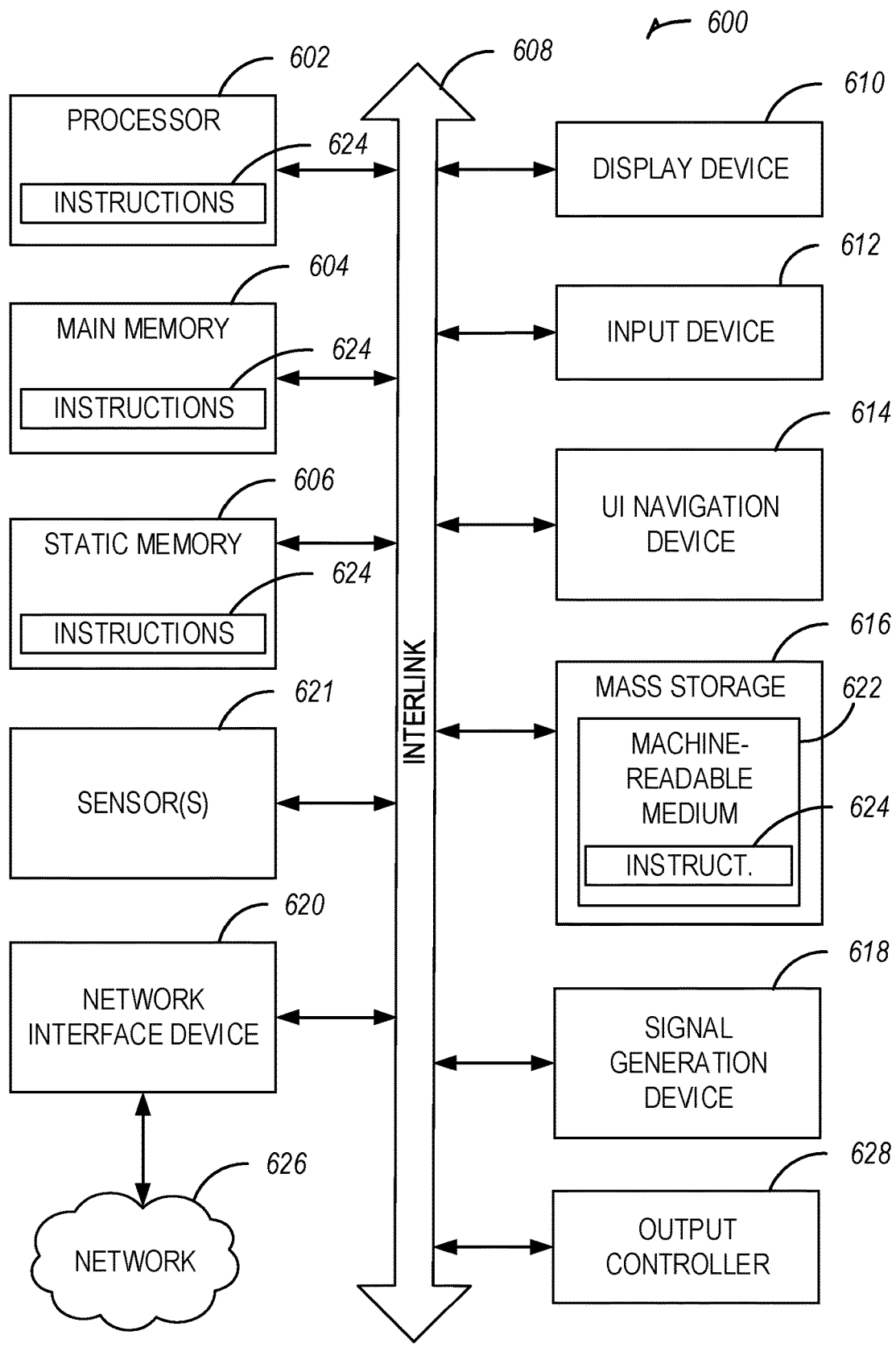
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for distributed in-vehicle sensor data processing comprising: at least one processor; and memory including instructions that, when executed by the at least one processor, cause the at least one processor to: receive a request for sensor data from vehicles; generate an application for collection of the sensor data, wherein the application includes, sensor requirements; identify a set of vehicles for distribution of the application based on available sensors in each vehicle corresponding to the sensor requirements; transmit the application to the set of vehicles; receive sensor data results from respective instances of the application executing on the set of vehicles; and transmit a command to remove the respective instances of the application from the set of vehicles.

In Example 2, the subject matter of Example 1 includes, wherein the request includes a location or a time of day for sensor data collection.

In Example 3, the subject matter of Example 2 includes, wherein identifying the set of vehicles is based on a location of each vehicle corresponding to the location of the request.

In Example 4, the subject matter of Examples 2-3 includes, instructions to: determine a schedule for execution of the application based on the time of day for collection of the sensor data from the request; and transmit the schedule for execution of the application to the set of vehicles.

In Example 5, the subject matter of Examples 1-4 includes, instructions to: determine a priority for the application; and transmit the priority for the application to the set of vehicles, wherein the priority is defined based on present vehicle priorities.

In Example 6, the subject matter of Examples 1-5 includes, instructions to: validate that the sensor data results correspond to the request for sensor data; and transmit the sensor data results to a data consumer.

In Example 7, the subject matter of Example 6 includes, wherein validating the sensor data results includes using data heuristics for validation.

In Example 8, the subject matter of Examples 6-7 includes, wherein validating the sensor data results includes verifying the sensor data results comply with a privacy policy.

In Example 9, the subject matter of Examples 1-8 includes, wherein the request includes a duration for the collection of the sensor data.

In Example 10, the subject matter of Examples 1-9 includes, instructions to present, on a display, the sensor data results in a user interface.

Example 11 is at least one machine-readable medium including instructions for distributed in-vehicle sensor data processing, the instructions when executed by a machine, cause the machine to perform the operations comprising: receiving a request for sensor data from vehicles; generating an application for collection of the sensor data, wherein the application includes, sensor requirements; identifying a set of vehicles for distribution of the application based on available sensors in each vehicle corresponding to the sensor requirements; transmitting the application to the set of vehicles; receiving sensor data results from respective instances of the application executing on the set of vehicles; and transmitting a command to remove the respective instances of the application from the set of vehicles.

In Example 12, the subject matter of Example 11 includes, wherein the request includes a location or a time of day for sensor data collection.

In Example 13, the subject matter of Example 12 includes, wherein identifying the set of vehicles is based on a location of each vehicle corresponding to the location of the request.

In Example 14, the subject matter of Examples 12-13 includes, the operations further comprising: determining a schedule for execution of the application based on the time of day for collection of the sensor data from the request; and transmitting the schedule for execution of the application to the set of vehicles.

In Example 15, the subject matter of Examples 11-14 includes, the operations further comprising: determining a priority for the application; and transmitting the priority for the application to the set of vehicles, wherein the priority is defined based on present vehicle priorities.

In Example 16, the subject matter of Examples 11-15 includes, the operations further comprising: validating that the sensor data results correspond to the request for sensor data; and transmitting the sensor data results to a data consumer.

In Example 17, the subject matter of Example 16 includes, wherein validating the sensor data results includes using data heuristics for validation.

In Example 18, the subject matter of Examples 16-17 includes, wherein validating the sensor data results includes verifying the sensor data results comply with a privacy policy.

In Example 19, the subject matter of Examples 11-18 includes, wherein the request includes a duration for the collection of the sensor data.

In Example 20, the subject matter of Examples 11-19 includes, the operations further comprising presenting, on a display, the sensor data results in a user interface.

Example 21 is a method for distributed in-vehicle sensor data processing, the method comprising: receiving a request for sensor data from vehicles; generating an application for collection of the sensor data, wherein the application includes, sensor requirements; identifying a set of vehicles for distribution of the application based on available sensors in each vehicle corresponding to the sensor requirements; transmitting the application to the set of vehicles; receiving sensor data results from respective instances of the application executing on the set of vehicles; and transmitting a command to remove the respective instances of the application from the set of vehicles.

In Example 22, the subject matter of Example 21 includes, wherein the request includes a location or a time of day for sensor data collection.

In Example 23, the subject matter of Example 22 includes, wherein identifying the set of vehicles is based on a location of each vehicle corresponding to the location of the request.

In Example 24, the subject matter of Examples 22-23 includes, determining a schedule for execution of the application based on the time of day for collection of the sensor data from the request; and transmitting the schedule for execution of the application to the set of vehicles.

In Example 25, the subject matter of Examples 21-24 includes, determining a priority for the application; and transmitting the priority for the application to the set of vehicles, wherein the priority is defined based on present vehicle priorities.

In Example 26, the subject matter of Examples 21-25 includes, validating that the sensor data results correspond to the request for sensor data; and transmitting the sensor data results to a data consumer.

In Example 27, the subject matter of Example 26 includes, wherein validating the sensor data results includes using data heuristics for validation.

In Example 28, the subject matter of Examples 26-27 includes, wherein validating the sensor data results includes verifying the sensor data results comply with a privacy policy.

In Example 29, the subject matter of Examples 21-28 includes, wherein the request includes a duration for the collection of the sensor data.

In Example 30, the subject matter of Examples 21-29 includes, presenting, on a display, the sensor data results in a user interface.

Example 31 is a system for distributed in-vehicle sensor data processing, the system comprising: means for receiving a request for sensor data from vehicles; means for generating an application for collection of the sensor data, wherein the application includes, sensor requirements; means for identifying a set of vehicles for distribution of the application based on available sensors in each vehicle corresponding to the sensor requirements; means for transmitting the application to the set of vehicles; means for receiving sensor data results from respective instances of the application executing on the set of vehicles; and means for transmitting a command to remove the respective instances of the application from the set of vehicles.

In Example 32, the subject matter of Example 31 includes, wherein the request includes a location or a time of day for sensor data collection.

In Example 33, the subject matter of Example 32 includes, wherein identifying the set of vehicles is based on a location of each vehicle corresponding to the location of the request.

In Example 34, the subject matter of Examples 32-33 includes, means for determining a schedule for execution of the application based on the time of day for collection of the sensor data from the request; and means for transmitting the schedule for execution of the application to the set of vehicles.

In Example 35, the subject matter of Examples 31-34 includes, means for determining a priority for the application; and means for transmitting the priority for the application to the set of vehicles, wherein the priority is defined based on present vehicle priorities.

In Example 36, the subject matter of Examples 31-35 includes, means for validating that the sensor data results correspond to the request for sensor data; and means for transmitting the sensor data results to a data consumer.

In Example 37, the subject matter of Example 36 includes, wherein validating the sensor data results includes using data heuristics for validation.

In Example 38, the subject matter of Examples 36-37 includes, wherein validating the sensor data results includes verifying the sensor data results comply with a privacy policy.

In Example 39, the subject matter of Examples 31-38 includes, wherein the request includes a duration for the collection of the sensor data.

In Example 40, the subject matter of Examples 31-39 includes, means for presenting, on a display, the sensor data results in a user interface.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for distributed in-vehicle sensor data processing comprising:
    at least one processor; and
    memory configured to store instructions thereon that, when executed by the at least one processor, cause the at least one processor to:
        receive a request from a third party for sensor data from a set of vehicles, wherein the request specifies one or more sensor requirements including types of data to be collected and types of sensors required to collect the types of data;
        generate an application for collection of the sensor data, wherein the application is configured and customized based on the specified one or more sensor requirements to utilize one or more specific sensors available in the set of vehicles, wherein the set of vehicles is identified for distribution of the application based on a compatibility of the one or more specific sensors available in each vehicle with the the one or more sensor requirements;
        transmit the application to the set of vehicles;
        receive sensor data from the one or more specific sensors from respective instances of the application executing on the set of vehicles; and
        transmit a command to remove the respective instances of the application from the set of vehicles.

2. The system of claim 1, wherein the request includes a location or a time of day for sensor data collection.

3. The system of claim 2, wherein identifying the set of vehicles is based on a location of each vehicle corresponding to the location of the request.

4. The system of claim 2, further comprising instructions to:
    determine a schedule for execution of the application based on the time of day for collection of the sensor data from the request; and
    transmit the schedule for execution of the application to the set of vehicles.

5. The system of claim 1, further comprising instructions to:
    determine a priority for the application; and
    transmit the priority for the application to the set of vehicles, wherein the priority is defined based on present vehicle priorities.

6. The system of claim 1, further comprising instructions to:
    transform the received sensor data to a common format;
    validate that the received sensor data corresponds to the request for sensor data; and
    transmit sensor data results to a data consumer.

7. The system of claim 6, wherein validating the sensor data results includes using data heuristics for validation.

8. The system of claim 6, wherein validating the sensor data results includes verifying the sensor data results comply with a privacy policy.

9. The system of claim 1, wherein the request includes a duration for the collection of the sensor data.

10. The system of claim 1, further comprising instructions to present, on a display, the sensor data results in a user interface.

11. At least one non-transitory machine-readable medium configured to store instructions for distributed in-vehicle sensor data processing stored thereon, the instructions when executed by a machine, cause the machine to perform operations comprising:

receiving a request from a third party for sensor data from a set of vehicles, wherein the request specifies one or more sensor requirements including types of data to be collected and types of sensors required to collect the types of data;

generating an application for collection of the sensor data, wherein the application is configured and customized based on the specified one or more sensor requirements to utilize one or more specific sensors available in the set of vehicles, wherein the set of vehicles is identified for distribution of the application based on a compatibility of the one or more specific sensors available in each vehicle with the one or more sensor requirements;

transmitting the application to the set of vehicles;

receiving sensor data results from respective instances of the application executing on the set of vehicles; and transmitting a command to remove the respective instances of the application from the set of vehicles.

12. The at least one non-transitory machine-readable medium of claim 11, wherein the request includes a location or a time of day for sensor data collection.

13. The at least one non-transitory machine-readable medium of claim 12, wherein identifying the set of vehicles is based on a location of each vehicle corresponding to the location of the request.

14. The at least one non-transitory machine-readable medium of claim 12, the operations further comprising:

determining a schedule for execution of the application based on the time of day for collection of the sensor data from the request; and transmitting the schedule for execution of the application to the set of vehicles.

15. The at least one non-transitory machine-readable medium of claim 11, the operations further comprising:

determining a priority for the application; and transmitting the priority for the application to the set of vehicles, wherein the priority is defined based on present vehicle priorities.

16. The at least one non-transitory machine-readable medium of claim 11, the operations further comprising:

transforming the received sensor data to a common format;

validating that the received sensor data correspond to the request for sensor data; and transmitting sensor data results to a data consumer.

17. The at least one non-transitory machine-readable medium of claim 16, wherein validating the sensor data results includes using data heuristics for validation.

18. The at least one non-transitory machine-readable medium of claim 16, wherein validating the sensor data results includes verifying the sensor data results comply with a privacy policy.

19. The at least one non-transitory machine-readable medium of claim 11, wherein the request includes a duration for the collection of the sensor data.

20. The at least one non-transitory machine-readable medium of claim 11, the operations further comprising presenting, on a display, the sensor data results in a user interface.

21. A system for distributed in-vehicle sensor data processing, the system comprising:

means for receiving a request for sensor data from a set of vehicles, wherein the request specifies one or more sensor requirements including types of data to be collected and types of sensors required to collect the types of data;

means for generating an application for collection of the sensor data, wherein the application is configured and customized based on the specified one or more sensor requirements to utilize one or more specific sensors available in the set of vehicles, wherein the set of vehicles is identified for distribution of the application based on a compatibility of the one or more specific sensors available in each vehicle with the one or more the sensor requirements;

means for transmitting the application to the set of vehicles;

means for receiving sensor data from the one or more specific sensors from respective instances of the application executing on the set of vehicles; and means for transmitting a command to remove the respective instances of the application from the set of vehicles.

* * * * *